United States Patent [19]

Aono et al.

[11] Patent Number: 5,032,365
[45] Date of Patent: Jul. 16, 1991

[54] REACTION APPARATUS

[75] Inventors: Atsushi Aono; Rooku Fujimoto; Nobuyuki Itoh; Tatsuya Ikeda; Kiyoshi Tsuru, all of Kobe, Japan

[73] Assignee: Mitsubishi Denki Kabushiki Kaisha, Japan

[21] Appl. No.: 333,958

[22] Filed: Apr. 6, 1989

[30] Foreign Application Priority Data

| Jun. 14, 1988 | [JP] | Japan | 63-147708 |
| Jun. 14, 1988 | [JP] | Japan | 63-147709 |
| Jun. 14, 1988 | [JP] | Japan | 63-147710 |

[51] Int. Cl.$^5$ .............................................. B01J 8/06
[52] U.S. Cl. ..................... 422/197; 422/196; 422/312; 48/127.9
[58] Field of Search ............... 422/179, 193, 196, 197, 422/200, 204, 312; 48/94, 127.9, 196 A, 214 A; 252/373

[56] References Cited

U.S. PATENT DOCUMENTS

| 4,098,588 | 7/1978 | Buswell et al. | 422/197 X |
| 4,741,885 | 5/1988 | Herbort et al. | 422/197 |
| 4,820,314 | 4/1989 | Cohen et al. | 48/94 |
| 4,861,348 | 8/1989 | Koyama et al. | 48/196 A X |

FOREIGN PATENT DOCUMENTS

| 57-7538 | 2/1982 | Japan . |
| 2027033 | 2/1987 | Japan | 422/196 |

Primary Examiner—Robert J. Warden
Assistant Examiner—Rebekah Griffith
Attorney, Agent, or Firm—Leydig, Voit & Mayer

[57] ABSTRACT

A reaction tube of a reaction apparatus includes a circular cylindrical inner tube and an intermediate tube disposed concentrically with the inner tube. A catalyst used in reforming reactions is charged in the gap between the inner and the intermediate tubes. The inner tube accommodates filler particles and is provided with a hollow member disposed therein in contact with the filler particles and capable of absorbing stress resulting from thermal expansion of the filler particles. By virtue of the provision of the hollow member which absorbs thermal stress of the filler particles that are caused to undergo thermal expansion by a high-temperature gas, such as a combustion gas, flowing through the inside of the inner tube, the apparatus is capable of preventing any deformation or breakage of the inner tube.

8 Claims, 5 Drawing Sheets

REACTION APPARATUS

BACKGROUND OF THE INVENTION

1. Field of the Invention

The present invention relates to a reaction apparatus used to effect reactions, e.g., reforming reactions of materials such as hydrocarbon, within reaction tubes.

2. Description of the Related Art

A reaction apparatus related to the present invention is schematically shown in section in FIG. 1. As shown in this figure, a reaction tube 200 of the reaction apparatus basically comprises a circular cylindrical inner tube 31, an outer tube 32 disposed concentrically with the inner tube 31, an intermediate tube 33 disposed between these inner and outer tubes 31 and 32 concentrically therewith, and an annular end-cap 38 disposed at the respective one ends of the inner and the outer tubes 31 and 32. A first annular portion 34 is defined between the inner tube 31 and the intermediate tube 33, and allows the introduction therein of a material such as a material gas 9. A catalyst 36 provided for use in reforming reactions is charged in the first annular portion 34 and thus forms a catalyst layer 35 therein. A second annular portion 37 is defined between the intermediate tube 33 and the outer tube 32, and allows the flowing therethrough of reformed gas 10 produced by effecting reforming reactions while allowing the material gas 9 to pass through the catalyst layer 35. The first annular portion 34 and the second annular portion 37 communicate with each other through the annular end-cap 38, in which the reformed gas 10 flowing from the catalyst layer 35 disposed in the first annular portion 34 is inverted and is thus caused to flow into the second annular potion 37. The reformed gas 10 then flows within the second annular portion 37 in the direction opposite to the direction of the flow of the material gas 9.

An annular pan 39 for holding the crystal 36 is provided at that end of the first annular portion 34 closer to the ends where the annular end-cap 38 is provided. The pan 39 is formed with a plurality of holes (none of which are shown) through which the gas flows. The annular end-cap 38 is surrounded by an annular end-cap insulator 40 provided on the outer side of the end-cap 38. The inside of the inner tube 31 defines a flow passage 42 through which a high-temperature combustion gas 41, serving as the heat source, flows. At least the side of the flow passage 42 that includes the exit of the combustion gas 41 is filled with filler particles 43 comprising, for instance, a ceramic or metallic material. The heat of the combustion gas 41 is transferred to the first annular portion 34 through a gas radiation portion 44 and a solid radiation portion 45.

FIG. 2 schematically shows the arrangement of a heating furnace in which a plurality of such reaction tubes 200 are disposed. In FIG. 2, the same reference numerals as those in FIG. 1 are used to designate the same or corresponding parts or components. Referring to FIG. 2, a plurality of reaction tubes 200 are disposed within a heating furnace 201. A burner 211 is disposed at one end of the heating furnace 201, while an inlet manifold 221 through which a material gas 9 is introduced into the heating furnace 201 is provided at the other end. Further, the heating furnace 201 is provided with an outlet manifold 231 for reformed gas 10 which communicates with each of the reaction tubes 200 and through which the reformed gas 10 is discharged, and an exhaust manifold 241 for a combustion gas 41 which communicates with each reaction tube 200 and through which the combustion gas 41 is exhausted after use. The wall of the heating furnace 201 is provided with a furnace wall insulator 251 which is shown in FIG. 2 as being integral with the wall of the furnace 201. In addition, heat insulators 46 are provided around the outer sides of the reaction tubes 200, more specifically, around the outer sides of the outer tubes 32. In the illustrated example, these heat insulators 46 are provided in the gaps between adjacent ones of the outer tubes 32 and in the gaps between the furnace wall insulator 251 and the adjacent outer tubes 32. With the above-described arrangement, therefore, the combustion gas 41 passes through the flow passages 42 alone, which are defined within the inner tubes 31. As a result, no combustion gas passes through the gaps between the outer tubes 32. In FIG. 2, the illustration of lines for supplying the burner 211 with gases required thereby, such as fuel and combustion air, is omitted.

Next, the operation of the above-described reaction apparatus will be explained. After hydrocarbon and steam, which form a material gas 9, have been preheated to a temperature of, e.g., about 450° C., they are introduced into the heating furnace 201 through the inlet manifold 221. The material gas 9 is then introduced into the first annular portions 34 located between the inner tubes 31 and the intermediate tubes 33 of the reaction tubes 200, thereby allowing the material gas 9 to flow through the catalyst layers 35 formed within the first annular portions 34 and thus contact with the catalyst 36. In this process, the material gas 9 undergoes steam reforming reactions whereby the material gas 9 is transformed into reformed gas 10 which is a mixture of such gases as $H_2$, CO, and $CO_2$. After the completion of the reactions, the reformed gas 10, which is at a high temperature (e.g., about 800° C.), passes through the gas-flow holes (not shown) of the annular pan 39, flows into the annular end-caps 38 in which the direction of flow of the reformed gas 10 is inverted, then flows into the second annular portions 37 located between the intermediate tubes 33 and the outer tubes 32. In this second annular portions 37, the reformed gas 10 flows in the direction opposite to that of flow of the material gas 9. In the process in which the reformed gas 10 flows through the second annular portions 37, heat transfer is proceeded between the reformed gas 10 and the intermediate tubes 33. After the sensible heat of the reformed gas 10 has been absorbed by the catalyst layers 35 through the walls of the intermediate tubes 33, the reformed gas 10 is discharged through the outlet manifold 231 to the outside of the system.

A combustion gas 41, serving as the heat source, is supplied by the burner 211 disposed within the heating furnace 201. The combustion gas 41 then flows through the flow passages 42 located inside the reaction tubes 200, more specifically within the inner tubes 31, along the inner walls of the inner tubes 31, whereby the wall portions of the inner tubes 31 that correspond to the gas radiation portions 44 are heated. After passing through the gas radiation portions 44, the combustion gas 41 flows through the solid radiation portions 45 filled with the filler particles 43, whereby the filler particles 43 are heated. Since the filler particles have a predetermined heat capacity, they emit solid radiation heat which is at a temperature level determined by the interrelation between their heat capacity and their emission capacity even when there are, e.g., reductions in the fuel flow rate. Consequently, the wall portions of the inner tubes 31 that correspond to the gas radiation portions 44 and the wall portions of the inner tubes 31 that correspond to the solid radiation portions 45 are substantially uniformly heated. The heat of the thus heated wall portions is used to heat the material gas 9 flows through the catalyst layers 35, as well as to heat the reformed gas 10. The heating of the material gas 9 determines the starting conditions of the catalytic reactions, whereas the heating of the reformed gas 10 determines the degree of progress of the catalytic reactions. By virtue of these factors, therefore, it is possible to stabilize the reaction conditions even with variations in the fuel flow rate. Incidentally, the end-cap insulators 40 are provided to prevent any heating of the portions which need not be heated by the combustion gas 41, more specifically, the inside of the annular end-caps 38 that is not charged with any catalyst 36.

As described above, since the combustion gas 41 passes solely through the inside of the inner tubes 31, various portions of the walls of the inner tubes 31 are uniformly heated by the gas radiation of the combustion gas 41 and the solid radiation of the filler particles 43, thereby enabling the catalyst layers 35 to be uniformly heated through the walls of the inner tubes 31 and, accordingly, enabling the reforming reactions to be effected uniformly. In addition, because the combustion gas 41 which has been supplied by the burner 211 flows through the inside of the inner tubes 31, it suffices if the space (the combustion space) within the heating furnace 201, which is filled with the combustion gas 41, has a dimension corresponding to the length of the burner flames.

Among various tube-wall portions of each reaction tube 200, the one that has the highest wall temperature is a wall portion of the inner tube 31 which is located most upstream of the flow of the combustion gas 41 and which is not covered with the end-cap insulator 40. Since this wall portion does not directly face the wall of the furnace 201, the solid radiation heat from the furnace wall can be neglected. This renders the gas radiation from the combustion gas 41 prevailing within the inner tube 31 predominant, and the combustion gas 41 thus makes it possible to effect uniform heating. On the other hand, the wall temperatures of the inner tubes 31, which may vary between the reaction tubes 200, can be made uniform by making uniform the amount of supply of the combustion gas 41 to each of the reaction tubes 200.

The above-described reaction apparatus, however, encounters various problems. For instance, since the filler particles 43 charged in the flow passages 42 provided for a combustion gas 41 and defined within the inner tubes 31 are heated by the combustion gas 41 serving as the heat source and being at a high temperature, the volume of the filler particles 43 is increased by thermal expansion. Thermal stress resulting from the increase in volume may act on the inner tubes 31, and may cause the inner walls of the inner tubes 31 to be deformed, or broken in the worst case. In some cases, there is a further risk that the filler particles 43 may become damaged.

SUMMARY OF THE INVENTION

The present invention has been accomplished in view of the above-described problems, and it is an object of the present invention to provide a reaction apparatus which is capable of preventing any deformation or breakage of the inner tubes of the reaction tubes, and is thus capable of exhibiting a high level of reliability.

According to the present invention, a reaction apparatus comprises a reaction tube having: an inner tube whose inside allows the flow of a high-temperature gas therethrough; an outer tube disposed on the outer peripheral side of the inner tube concentrically therewith; an intermediate tube disposed between the inner tube and the outer tube concentrically therewith; a first annular portion defined between the inner tube and the intermediate tube and allowing the introduction of a material to the inside thereof; a catalyst layer formed in the first annular portion by charging the first annular portion with a catalyst; a second annular portion defined between the intermediate tube and the outer tube and allowing the flow therethrough of a gas produced by causing the material to flow through the catalyst layer; an annular end-cap disposed at the respective one ends of the inner tube and the outer tube, the first annular portion and the second annular portion communicating with each other through the annular end-cap, and the gas flowing from the catalyst layer being then allowed by the annular end-cap to flow into the second annular portion; a filler particle layer formed in the inner tube by charging the inner tube with filler particles; and a hollow member disposed within the inner tube and in contact with the filler particle layer, the hollow member being capable of absorbing stress resulting from thermal expansion of the filler particles.

DESCRIPTION OF THE PREFERRED EMBODIMENTS

Figure 1:
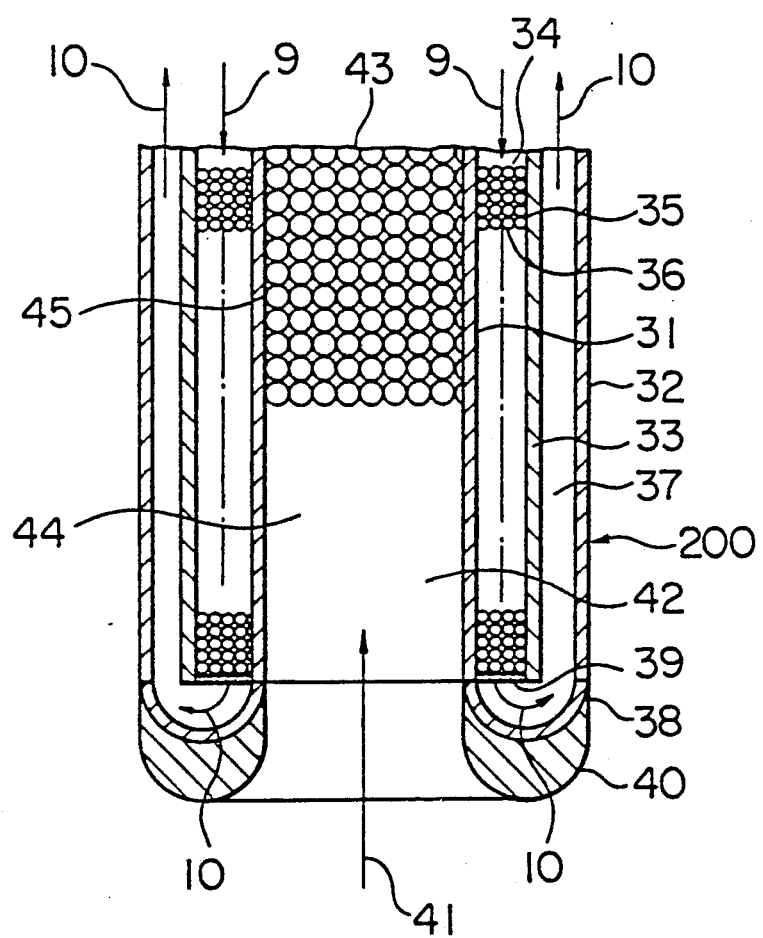
FIG. 1 is a view schematically showing the arrangement of a reaction tube of a reaction apparatus related to the present invention.
Figure 2:
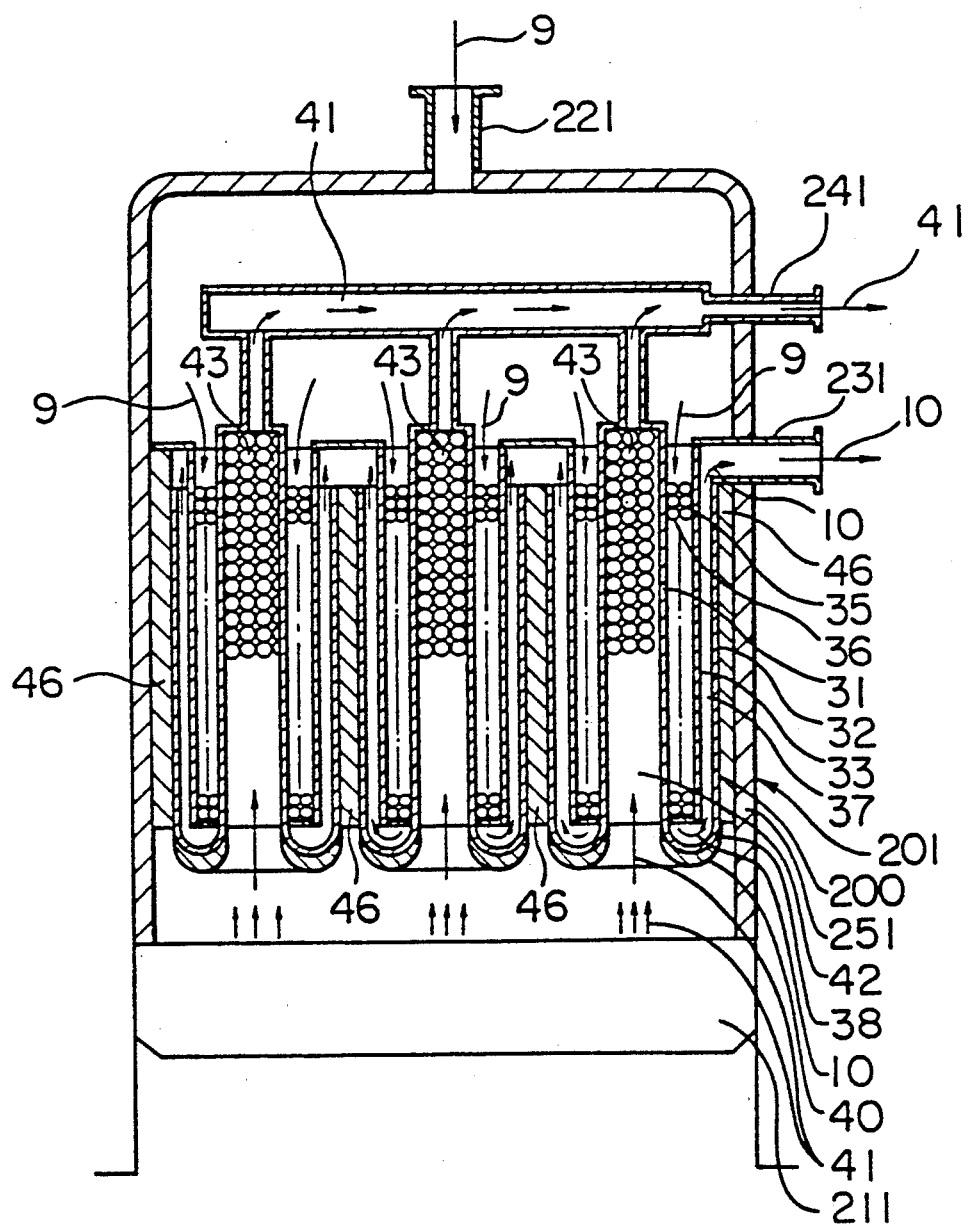
FIG. 2 is a view schematically showing the arrangement of a heating furnace in which a plurality of reaction tubes, each being such as that shown in FIG. 1, are disposed.
Figure 3:
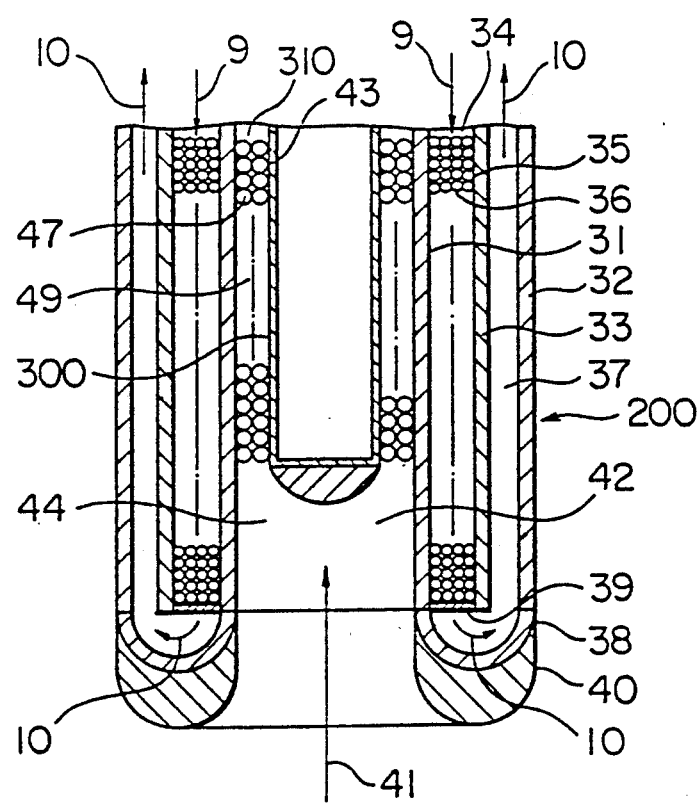
FIG. 3 is a view schematically showing the arrangement of a reaction apparatus in accordance with one embodiment of the present invention.
Figure 4:
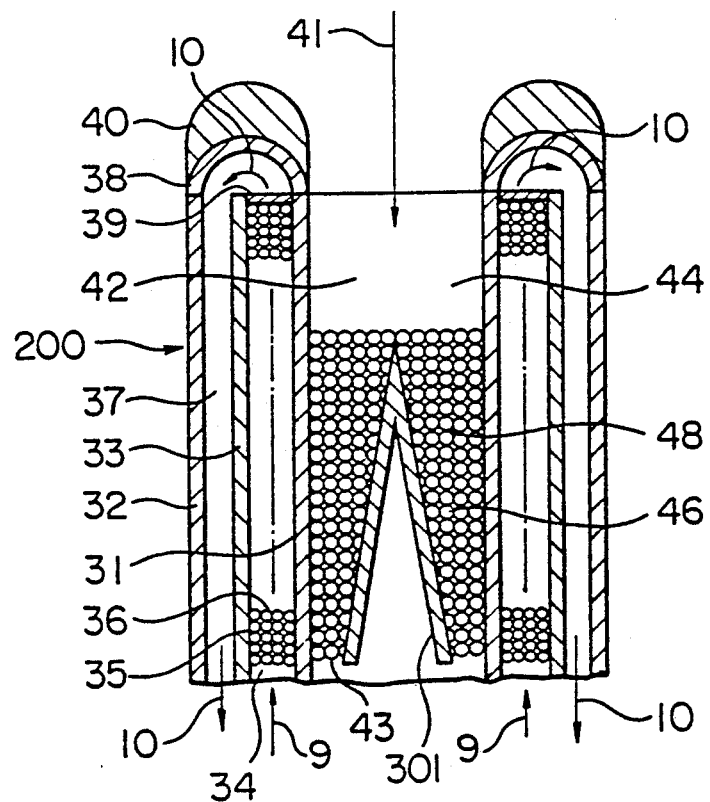
FIG. 4 is a view schematically showing the arrangement of a reaction apparatus in accordance with another embodiment of the present invention.
Figure 5:
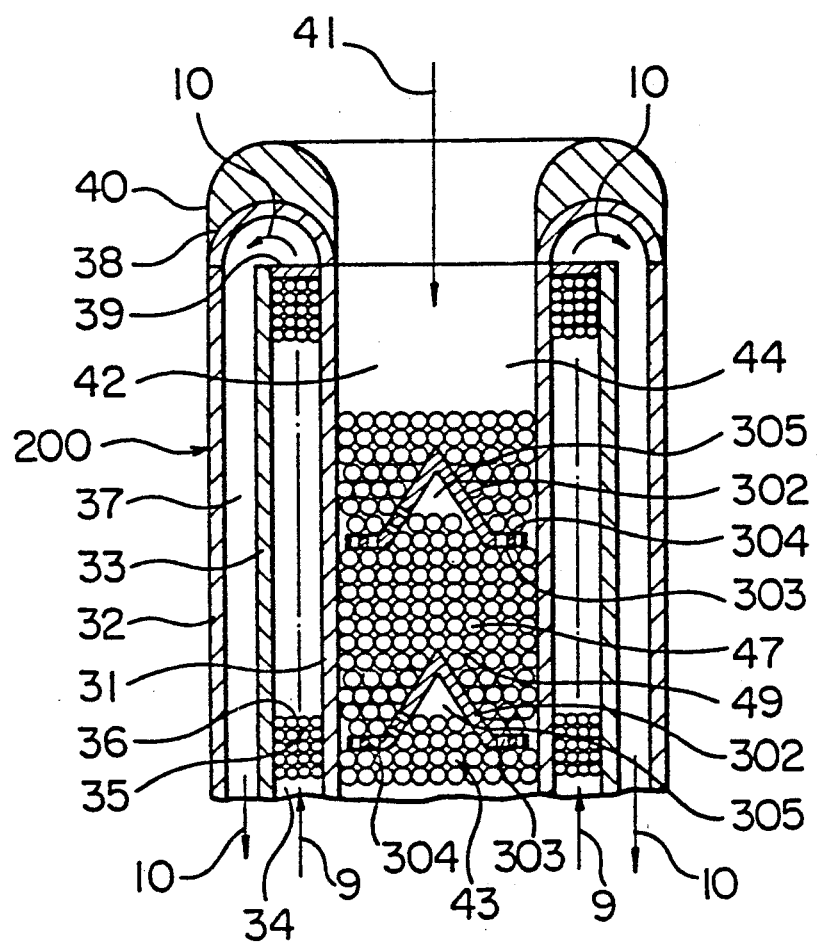
FIG. 5 is a view schematically showing the arrangement of a reaction apparatus in accordance with a further embodiment of the present invention.

One embodiment of the present invention will be described hereunder with reference to FIG. 3. In FIG. 3, reference numerals 9, 10, 31 to 42, 44, and 200 designate parts or components which correspond to those shown in FIGS. 1 and 2. In FIGS. 3 to 5, the same reference numerals designate the same or corresponding parts or components.

Referring to FIG. 3, in the inner tube 31 of the reaction tube 200, a circular cylindrical core body 300 formed of a thin-walled metal material and serving as a hollow member is disposed concentrically with the inner tube 31. A third annular portion 310 is defined between the inner tube 31 and the core body 300, and allows a high-temperature combustion gas 41, serving as the heat source, to flow therethrough. A filler particle layer 47 is formed within the third annular portion 310 by charging the third annular portion 310 with filler particles 43 formed of, for instance, a ceramic or metallic material. The filler particle layer 47 formed in this way brings forth the formation of a solid radiation portion 49.

Figure 6:
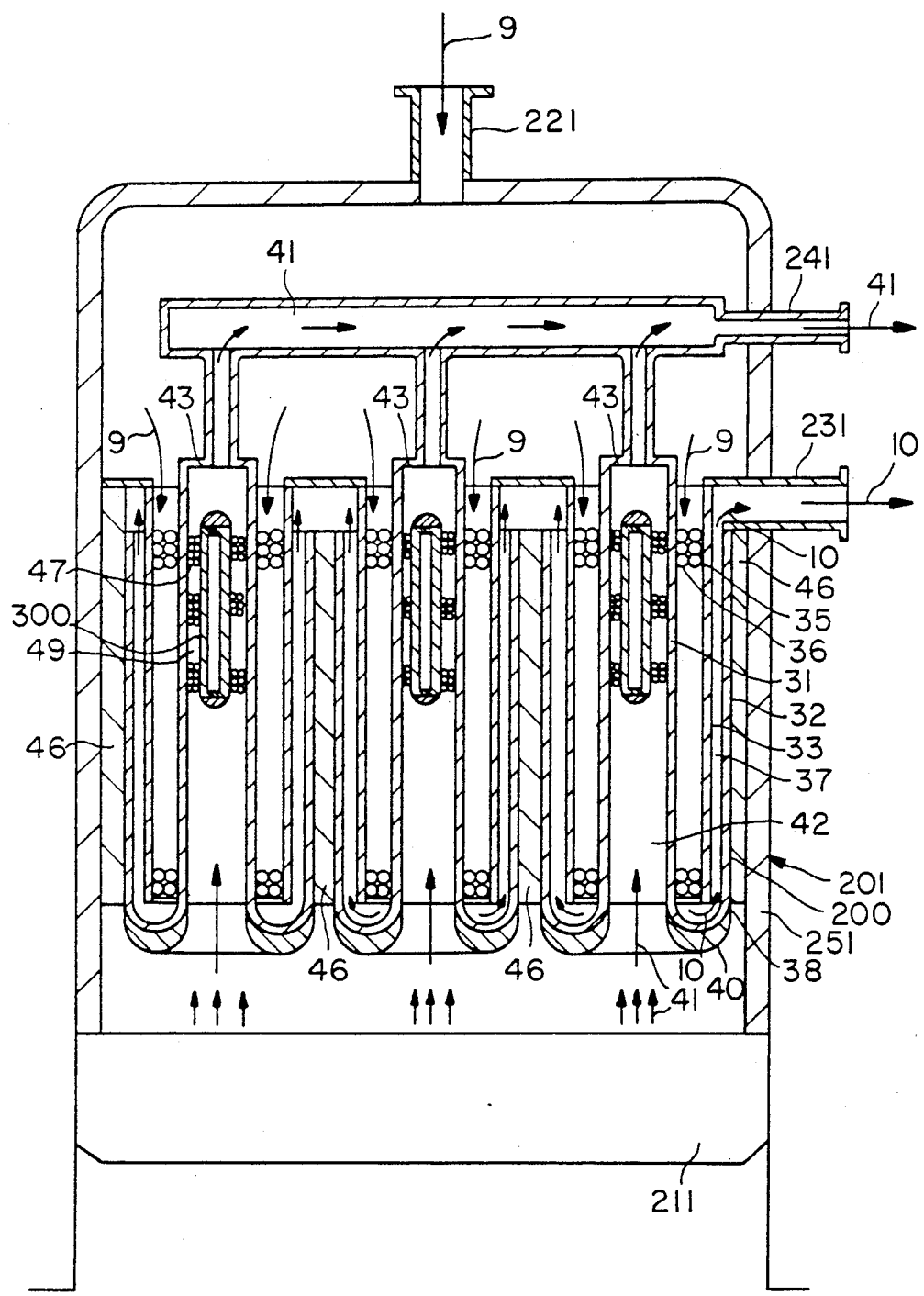
FIG. 6 is a schematic view showing a heating furnace in which a plurality of reaction tubes, each such as that shown in FIG. 3, are disposed.

Next, the operation of the reaction apparatus will be explained with reference to FIG. 6. After hydrocarbon and steam, which form a material gas 9, an example of a material, have been preheated to a temperature of, e.g., about 450° C., they are introduced into a heating furnace 201 through an inlet manifold 221 The material gas 9 is then introduced into the first annular portion 34 located between the inner tube 31 and the intermediate tube 33 of the reaction tube 200, thereby allowing the material gas 9 to flow through the catalyst layer 35 formed within the first annular portion 34 and thus contact with the catalyst 36. In this process, the material gas 9 undergoes steam reforming reactions whereby the material gas 9 is transformed into reformed gas 10 which is a mixture of such gases as $H_2$, CO, and $CO_2$. After the completion of the reactions, the reformed gas 10, which is at a high temperature (e.g., about 800° C.), passes through the gas-flow holes (not shown) of the annular pan 39, flows into the annular end-cap 38 in which the direction of the flow of the reformed gas 10 is inverted, then flows into the second annular portion 37 located between the intermediate tube 33 and the outer tube 32. In the second annular portion 37, the reformed gas 10 flows in the direction opposite to that of the flow of the material gas 9. In the process in which the reformed gas 10 flows through the second annular portion 37, heat transfer is proceeded between the reformed gas 10 and the intermediate tube 33. After the sensible heat of the reformed gas 10 has been absorbed by the catalyst layer 35 through the wall of the intermediate tube 33, the reformed gas 10 is discharged through the outlet manifold 231 to the outside of the system.

A combustion gas 41, serving as the heat source, is supplied by a burner 211 disposed within the heating furnace 201. The combustion gas 41 then flows through the flow passage 42 located inside the reaction tube 200, more specifically within the inner tube 31, along the inner wall of the inner tube 31, whereby the wall portion of the inner tube 31 that corresponds to the gas radiation portion 44 is heated. After passing through the gas radiation portion 44, the combustion gas 41 flows into the third annular portion 310. In this third annular portion 310, the filler particle layer 47 is formed by charging the portion 310 with filler particles 43, thereby providing the solid radiation portion 49. The combustion gas 41 which has flowed into the third annular portion 310 passes through the solid radiation portion 49 and thus heats the filler particles 43. Since the filler particles 43 have a predetermined heat capacity, they emit solid radiation heat which is at a temperature level determined by the interrelation between their heat capacity and their emission capacity even when there are, e.g., reductions in the fuel flow rate. Consequently, the wall portion of the inner tube 31 that corresponds to the gas radiation portion 44 and the wall portion of the inner tube 31 that corresponds to the solid radiation portion 49 are substantially uniformly heated. The heat of the thus heated wall portions is used to heat the material gas 9 flow through the catalyst layer 35, as well as to heat the reformed gas 10.

As described above, the combustion gas 41 passes through the flow passage 42 and the third annular portion 310 which are both within the inner tube 31, portions of the wall of the inner tube 31 are uniformly heated by the gas radiation of the combustion gas 41 and the solid radiation of the filler particles 43, thereby allowing the catalyst layer 35 to be uniformly heated through the wall of the inner tube 31 and, accordingly, enabling the reforming reactions to be effected uniformly.

Since the core body 300 comprises a circular cylindrical body formed of a thin-walled metal material, the core body 300 is capable of absorbing thermal stress of the filler particles 43 which undergo thermal expansion by being heated by the combustion gas 41. Thus, by virtue of the provision of the core body 300, it is possible to prevent any deformation or breakage of the wall of the inner tube 31, and to prevent any damage to the filler particles 43.

Although in the foregoing embodiment, the core body 300 comprises a circular cylindrical body formed of a metal material, the core body 300 may alternatively comprise a circular cylindrical body formed of a non-metallic material. Still alternatively, the core body 300 may comprise a body having a configuration other than the circular cylindrical configuration, as will be described later.

Further, in the foregoing embodiment, a heat insulator 46 (not shown) is provided around the outer periphery of the reaction tube 200 for the purpose of achieving an insulating effect whereby the reformed gas 10 flowing through the second annular portion 37 is prevented from being subjected to radiation heat by the combustion gas 41. However, it is not always necessary to provide such a heat insulator 46. Even in the case where no insulator of this type is provided, effects similar to those provided in the foregoing embodiment could be achieved.

Further, in the foregoing embodiment, the reaction tube 200 is disposed in such a manner as to be suspended, that is, in such a manner that the annular end-cap 38 is positioned on the upper side so that the combustion gas 41 flows from the lower side to the upper side. However, the reaction tube 200 may alternatively be disposed in the reverse manner so that the direction of the flow of the combustion gas 41 is upside down.

Further, although in the foregoing embodiment, the second annular portion 37 acts as a flow passage of reformed gas, the second annular portion 37 may be additionally provided with fine wire, baffle plates or the like disposed therein to promote heat transfer.

In the description given above, the present invention is applied to a reaction apparatus in which steam reforming reactions are effected. However, it would be easily understood that the arrangements of the present invention may be applied to various reaction apparatuses in general, for instance, to a heat absorbing or heat generating reaction apparatuses.

FIG. 4 schematically shows the arrangement of a reaction apparatus in accordance with another embodiment of the present invention. Referring to FIG. 4, there is shown a case where a reaction tube 200 is disposed in the reverse manner or upside down as compared to the apparatus shown in FIG. 3. In the apparatus shown in FIG. 4, the combustion gas 41 flows from the upper side to the lower side, and the material gas 9 flows from the lower side to the upper side. A circular conical body 301, serving as the hollow member, is disposed within the inner tube 31 concentrically therewith.

The filler particles 43 are heated by the combustion gas 41, and the resulting thermal expansion of the particles 43 causes an increase in their volume. The volume of the filler particle layer 47 increases in correspondence with the increase in volume of the filler particles 43. At this time, however, the increase in volume of the filler particle layer 47 is compensated for in the following manner. Since the circular conical body 301 forms an inclined surface at which the body 301 contacts with the filler particle layer 47, the filler particles 43 with an increased volume are allowed to move naturally along the inclined surface, i.e. the circular conical surface, toward the apex of the circular conical body 301. In addition, since the circular conical body 301 per se is subjected to stress resulting from the increase in volume of the filler particle layer 47 of the thermally expanded filler particles 43, the circular conical body 301 undergoes deformation inwardly thereof, thereby absorbing the stress. Consequently, it is possible to prevent any deformation or breakage of the wall of the inner tube 31, as well as to prevent any damage to the filler particles 43.

Although in the above-described embodiment, the circular conical body 301 has a completely circular conical configuration, the circular conical body 301 may alternatively have a circular conical configuration in which part of the apex portion is omitted and which is therefore like a frustum, or have another configuration of this kind. The circular conical body 301 may be formed either into an integral structure or by assembling a plurality of divided parts individually formed.

Further, although in the above-described embodiment, the reaction tube 200 is suspended in such a manner that the combustion gas flows from the upper side to the lower side, the reaction tube 200 may be alternatively suspended in the reverse manner so that the combustion gas flows from the lower side to the upper side.

FIG. 5 schematically shows the arrangement of a reaction apparatus in accordance with a further embodiment of the present invention. Referring to FIG. 5, there is shown another case where a reaction tube 200 is disposed in the reverse manner or upside down as compared to the apparatus shown in FIG. 3. In the apparatus shown in FIG. 5, the combustion gas 41 flows from the upper side to the lower side, and the material gas 9 flows from the lower side to the upper side. A plurality of circular conical bodies 302, which each have a flange 303 at the base thereof and which serve as the hollow member, are disposed within the inner tube 31 concentrically therewith. A plurality of holes 304 through which the combustion gas 41 flows are formed in the flange portion 303 and in another part of each conical body 302. Filler particles 43 are disposed in such a manner as to form a sandwich structure in cooperation with the vertically spaced conical bodies 302. A space 305 is defined within the apex portion of each conical body 302.

The filler particles 43 are heated by the combustion gas 41, and the resulting thermal expansion of the particles 43 causes an increase in their volume. The volume of the filler particle layer 47 increases in correspondence with the increase in volume of the filler particles 43. At this time, however, the increase in volume of the filler particle layer 47 is compensated for in the following manner. Since the circular conical bodies 302 form inclined surfaces at which these bodies 302 contact with the filler particle layer 47, the filler particles 43 with an increased volume are allowed to move naturally along the inclined surfaces, i.e. the circular conical surfaces, toward the apexes of the circular conical bodes 302, with the increase in volume of the filler particles that are on the inside of the circular conical bodies 302 being compensated for by the space 305. In addition, since the circular conical bodies 302 per se are subjected to stress resulting from the increase in volume of the filler particle layer 47 of the thermally expanded filler particles 43, the circular conical bodies 302 undergo deformation inwardly thereof, thereby absorbing the stress. Consequently, it is possible to prevent any deformation or breakage of the wall of the inner tube 31, as well as to prevent any damage to the filler particles. In addition, since part of the filler particles 43 are on the inside of the circular conical bodies 302, it is possible to compensate for any sinking of the filler particle layer 47 due to deformation of the circular conical bodies 302 or breakage of the filler particles 43. In this way, the effect of the heat capacity of the filler particles 43 can be maintained stably and for a long period.

Although in the above-described embodiment, the circular conical bodies 302 have a completely circular conical configuration, they may alternatively have a circular conical configuration in which part of the apex portion is omitted and which is therefore like a frustum, or have another configuration of this kind. In addition, the circular conical bodies 302 may be formed either into an integral structure or by assembling a plurality of divided parts individually formed.

Further, although in the above-described embodiment, the reaction tube 200 is suspended in such a manner that the combustion gas flows from the upper side to the lower side, the reaction tube 200 may be alternatively suspended in the reverse manner so that the combustion gas flows from the lower side to the upper side.

What is claimed is:

1. A reaction apparatus having a reaction tube comprising: an inner tube whose inside allows flow of a high temperature gas therethrough;
    an outer tube disposed on an outer peripheral side of said inner tube concentrically therewith;
    an intermediate tube disposed between said inner tube and said outer tube concentrically therewith;
    a first annular portion defined between said inner tube and said intermediate tube and allowing introduction of a material therein;
    a catalyst layer in said first annular portion;
    a second annular portion defined between said intermediate tube and said outer tube and allowing flow therethrough of a gas produced by causing the material to flow through said catalyst layer;
    an annular end-cap disposed at one end of said inner tube and said outer tube respectively, said first annular portion and said second annular portion communicating with each other through said annular end-cap such that the gas flows from said catalyst layer into said second annular portion through said annular end-cap;
    a filler particle layer formed in said inner tube by charging said inner tube with filler particles; and
    a hollow member disposed within said inner tube and in contact with said filler particle layer, said hollow member being capable of absorbing stress resulting from thermal expansion of the filler particles.

2. A reaction apparatus according to claim 1 wherein said hollow member has a circular cylindrical configuration.

3. A reaction apparatus according to claim 1 wherein said hollow member has a circular conical configuration.

4. A reaction apparatus according to claim 3 further comprising a plurality of circular conical hollow members, each of said hollow members having a bottom and a flange provided at the bottom thereof.

5. A reaction apparatus according to claim 4 wherein each of said circular conical hollow members has holes formed therethrough.

6. A reaction apparatus according to claim 1 wherein said reaction tube has an upper end and wherein said annular end-cap is positioned on the reaction tube upper end.

7. A reaction apparatus according to claim 1 wherein said reaction tube has a lower end and wherein said annular end-cap is positioned on the reaction tube lower end.

8. A reaction apparatus comprising a plurality of reaction tubes constructed according to claim 1 and disposed in a heating furnace.

* * * * *